Oct. 3, 1972     M. W. PERGA ET AL     3,695,850
SELF-CLEANING CATALYTIC CONVERTER
Filed Aug. 31, 1970
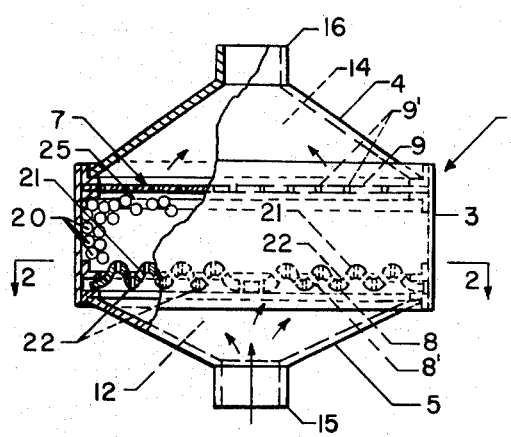
FIG. 1
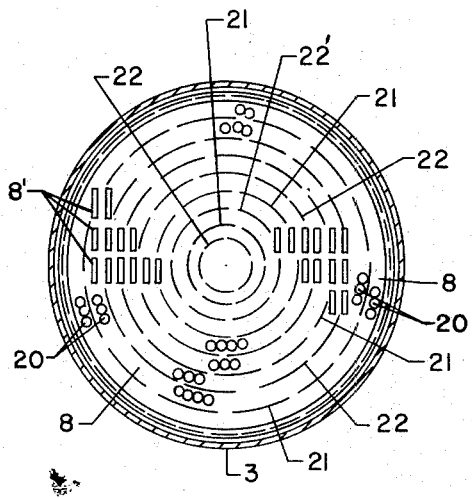
FIG. 2
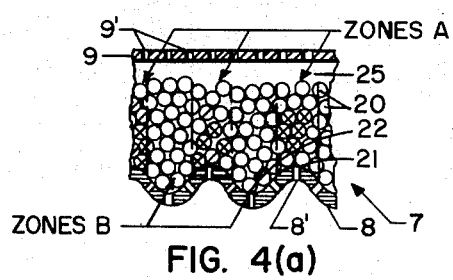
FIG. 4(a)
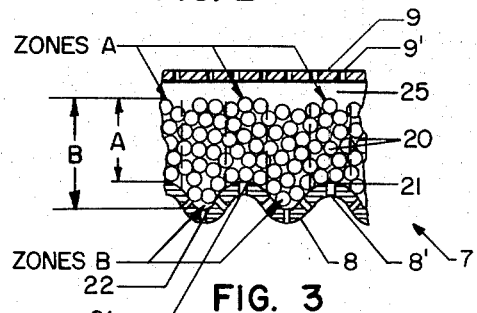
FIG. 3
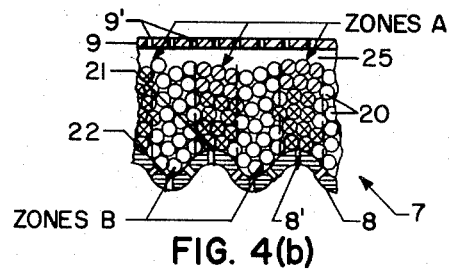
FIG. 4(b)
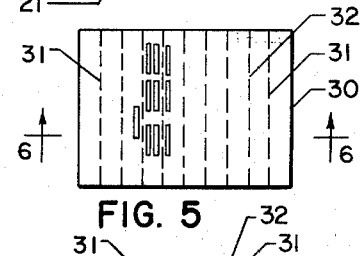
FIG. 5
FIG. 6
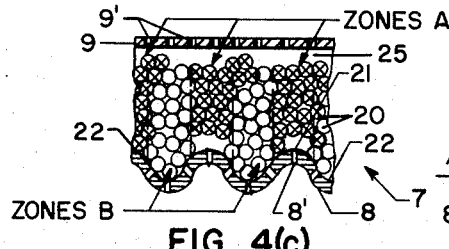
FIG. 4(c)
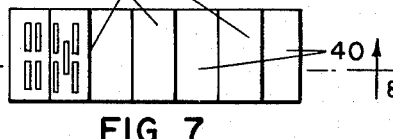
FIG. 7
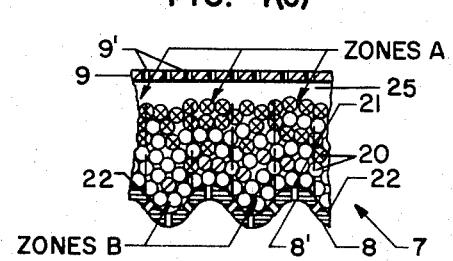
FIG. 4(d)
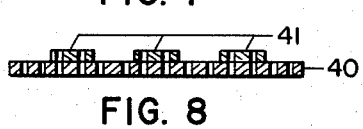
FIG. 8
INVENTORS:
Martin W. Perga
Ted V. DePalma
BY:
James R. Hoatson, Jr.
Ronald H. Hausch
ATTORNEYS

United States Patent Office 3,695,850
Patented Oct. 3, 1972

3,695,850
SELF-CLEANING CATALYTIC CONVERTER
Martin W. Perga, Hoffman Estates, and Ted V. De Palma, Roselle, Ill. (both of 30 Algonquin Road, Des Plaines, Ill. 60016)
Filed Aug. 31, 1970, Ser. No. 72,249
Int. Cl. F01m 3/16
U.S. Cl. 23—288 F
4 Claims

ABSTRACT OF THE DISCLOSURE

A self-cleaning catalytic converter for conversion of soot-laden exhaust gases. The converter has a catalyst retaining section with catalyst material therein. Adjacent flow zones are established through the catalyst material, with each flow zone having a different flow resistance than the adjacent one. Thus, the mass flow velocity through one flow zone will be greater than through an adjacent one. The catalyst material is packed loosely which permits movement of the catalyst material. As the pressure drop increases in some of the flow zones from soot deposition, the catalyst material will move from each flow zone to an adjacent flow zone thus permitting more efficient conversion of the soot within the exhaust gases.

---

The present invention relates to the means for effecting the treatment of exhaust gases emitted from an internal combustion engine. More particularly, it is directed to a catalytic converter for conversion of exhaust gases emitted from an internal combustion engine and especially to a converter that is ideally suited for the elimination of soot carried by the exhaust gases.

The desirability of removing or converting the noxious compounds of vehicular exhaust gases has been generally well established. The unavoidably incomplete combustion of hydrocarbon fuel by an internal combustion engine results in the generation of substantial quantities of unburned hydrocarbons, and undesirable products which, as waste products, discharge into the atmosphere through the exhaust line. Such partially oxidized products, and part of all these components contribute to the air pollution problem presently facing various geographical areas of the world.

In a catalytic operation, the hot gases issuing from an engine exhaust manifold are passed through a catalyst retaining section or conversion zone maintained within a converter, so as to effect a more or less complete oxidation of carbon monoxide, unburned hydrocarbons, and oxides of nitrogen present in the exhaust stream.

It has been found that one of the difficulties encountered in the utilization of catalytic converters for effecting the oxidation of exhaust gases arises when "poisoning" of the catalyst material occurs. For instance, it has been found that in diesel-powered vehicles which are operated a large percentage of the time in idle or low power modes, the engine effluent of these lower power modes is so low in temperature that even highly active oxidation catalysts failed to cause the complete burning of the undesired condensed carbonaceous material, or soot, in the effluent, which in turn tends to reduce the efficiency of the converter and of the engine because of buildup of back pressure in the exhaust system. We have found that the converter of this present invention eliminates soot "poisoning" by providing in effect a "self-cleaning" catalyst retaining section.

Therefore, it is a principal object of this invention to provide for a converter especially adapted for converting soot-laden exhaust gases of an internal combustion engine.

More particularly, it is an object of this invention to provide for a self-cleaning catalytic converter having varying resistance flow zones that provide for varying mass flow velocities through said flow zones.

Another object of this invention is to provide for a self-cleaning catalytic converters for treating soot-laden exhaust gases of a diesel engine which effectively eliminates the effect of soot "poisoning" on catalyst material within the conversion zone or retaining section of the catalytic converter.

In one of its broadest aspects, the present invention provides for a self-cleaning catalytic converter for conversion of soot-laden exhaust gases which comprises in combination: an outer housing; a catalyst retaining section having an inlet screen section and an outlet screen section spaced from the inlet screen section, said catalyst retaining section being spaced within said outer housing to establish an exhaust gas inlet manifold adjacent to said inlet screen section and an exhaust gas outlet manifold adjacent to said outlet screen section; inlet means communicating with said inlet manifold for introducing untreated exhaust gases therein; outlet means communicating with said outlet manifold for discharging treated exhaust gases therefrom; catalyst material within said catalyst retaining section; flow resistance means connected to said catalyst retaining section for establishing a group of spaced apart first flow zones through said catalyst material and a group of spaced apart second flow zones having a different flow resistance than the group of first flow zones adjacent to the group of first flow zones, whereby the mass flow velocity of said exhaust gases will be greater through one group of flow zones than through the adjacent group of flow zones; and, means provided within said catalyst retaining section for permitting movement of catalyst material therein, whereby as the pressure drop increases in one group of flow zones resulting from soot deposition in that group of flow zones, catalyst material will move from each flow zone to the adjacent flow zone, thus permitting more efficient conversion of the soot within said exhaust gases and preventing significant reactor pressure drop increase.

Preferably, the flow resistance means is established by varying the depth of the catalyst material in a predetermined manner. This is best effected by utilizing the inlet screen section as the lowermost screen section of the catalyst retaining section. Thus, the inlet screen section is utilized as the support of the catalyst material within the catalyst retaining section. To vary the depth of the bed of catalyst material within the catalyst retaining section in a predetermined manner the inlet screen section is curved in a predetermined manner. It may be curved for instance to have longitudinal ridges and valleys thereacross. Thus, when the material is placed within the retaining section to a certain level within the retaining section, the depth of the bed of catalyst material will vary according to the height of the ridges and valleys on the inlet screen section. Thus, the incoming exhaust gases flowing through the inlet screen from the manifold section will "find" flow zones having different flow resistances and consequently the mass flow velocity through the flow zones will vary. The result of this is that in the shallow flow zones the mass flow velocity will be greater than in the deeper flow zones. We have found that in the deeper flow zones substantially all soot within exhaust gases passing therethrough is oxidized under normal conditions, while the soot in the exhaust gases flowing through the shallower flow zones tends to build up upon the catalyst material within those flow zones. As the buildup occurs, the pressure drop increases through the shallower flow zones until there is a tendency for the material in the shallow flow zones to lift.

The means for establishing movement of catalyst material within the catalyst retaining section is generally established by providing a space between the uppermost catalyst material and the outlet screen of the retaining section. Thus, as the catalyst material tends to lift resulting from soot deposition in the shallower flow zones, fresh catalyst material from the deeper flow zones will move to the shallower flow zones and the soot-covered catalyst material from the shallow flow zones will tend to move into the deeper flow zones. Since the mass flow velocity is less in the deeper flow zones, the soot on the catalyst material in those flow zones will oxidize under the influence of the catalyst material. This cycle continues itself and thus permits more efficient conversion of the soot within the exhaust gases and prevents significant total reactor pressure drop increases. Thus, in effect the particular design establishes a self-cleaning catalyst retaining section.

Reference to the accompanying diagrammatical drawing and to the following description thereof will serve to better illustrate the construction and arrangement of the present invention as well as set forth additional advantageous features thereof.

FIG. 1 is an elevational view, shown partially in section, of a preferred embodiment of this present invention.

FIG. 2 is a sectional view of the embodiment of FIG. 1 as taken through section line 2—2.

FIG. 3 is a sectional view of a portion of the catalyst retaining section of the embodiment of FIG. 1.

FIG. 4a is a schematical illustration of soot buildup within the portion of the retaining section of FIG. 3.

FIG. 4b is a schematical illustration of further soot buildup within the portion of the retaining section of FIG. 3.

FIG. 4c is a schematical illustration of the movement of catalyst particles within the portion of the catalyst retaining section of FIG. 3.

FIG. 4d is a schematical illustration of the portion of the catalyst retaining section of FIG. 3 showing the result of the movement of catalyst material therein.

FIG. 5 is a plan view of a modified inlet screen section that may be utilized in conjunction with the present invention.

FIG. 6 is a sectional view of the screen section as taken along section line 6—6 of FIG. 5.

FIG. 7 is a plan view of a modified inlet screen section that may be utilized in conjunction with the present invention.

FIG. 8 is a sectional view of the screen section as taken along section line 8—8 of FIG. 7.

Referring now more particularly to FIGS. 1 and 2 of the drawing there is shown a catalytic converter 1 which includes a three-piece outer housing. The outer housing comprises a cylindrical portion 3 and two frusto end portions 4 and 5. The particular shape of this converter as well as the arrangement of the components thereof should not be limiting upon this present improvement for it is only shown by way of example and other configurations may well be utilized in conjunction with the present invention which centers about the catalyst retaining section. The catalyst retaining section 7 has an inlet screen section 8 with perforations 8' and an outlet screen section 9 with perforations 9' spaced from the inlet screen section 8. Catalyst retaining section 7 is spaced within the outer housing 1 to establish an exhaust gas inlet manifold 12 adjacent to the inlet screen 8 and an exhaust gas outlet manifold 14 adjacent to the outlet screen section 9. Also included is an inlet means 15 which communicates with the inlet manifold 12 for introducing untreated exhaust gases therein. The inlet means 15 should be adapted for connection to the exhaust system of the internal combustion engine in which the converter is to be used. An outlet means 16 communicates with the outlet manifold 14 for discharging the treated exhaust gases from the outlet manifold 14. Of course, also included within this catalytic converter is the catalyst material 20 within the retaining section 7.

With regard to the particular type of catalyst material, it is not intended to limit this improved type of catalytic converter to any one particular type of oxidation catalyst, inasmuch as there are various known effective and efficient catalyst compositions. Suitable oxidation catalysts include the metals of Groups I, V, VI, VII, and VIII of the Periodic Table, particularly chromium, copper, nickel, and platinum. These components may be used singly or in combination of two or more, etc., and will generally be composited with an inorganic refractory support material, such as alumina, silica-alumina, silica-alumina-zirconia, silica-thoria, silica-boria, or the like. The physical shape for the catalyst material may be such that they are in the form of spheres, cylinders, or pellets, typically having a dimension of one sixteenth to one quarter inch, although particles of larger or smaller dimensions may be employed where desirable. Mixed sizes of catalyst material may also be well utilized especially as a means to provide for a low temperature catalytic oxidation process.

The inlet screen section 8 of the catalyst retaining section 7 is curved to have concentric circular ridges 21 and valleys 22. These ridges and valleys have been formed on the screen in a predetermined manner to vary the depth of the catalyst material within the catalyst retaining section.

Reference may now be made to FIG. 3 of the drawing where a blown-up sectional view of a portion of the catalyst retaining section 7 is shown. The ridges 21 and the valleys 22 establish a group of spaced apart first zones A having a minimum depth A and a group of spaced apart second flow zones B having a maximum depth B. Because of the different depth, the zones A and zones B will have different flow resistances. In other words, the deeper zones B will have a greater flow resistance than the shallower zones A. Therefore, the mass flow velocity of the exhaust gases flowing through the bed will be greater through flow zones A than through the adjacent group of flow zones B. A space 25 is provided within the catalyst retaining section 7 as a means for permitting the movement of the catalyst material therein. Initially, as the converter is utilized in the exhaust system of an internal combustion engine, the catalyst particles will be free from any soot deposits thereon as shown in FIG. 3. As it operates in conjunction with the exhaust system of the internal combustion engine, the exhaust gases will issue through the apertures 8' of the inlet screen 8 and pass into the catalyst material wherein the undesirable components of the exhaust gas stream are oxidized under the influence of the catalyst material 20. There after, the treated exhaust gases will pass through the apertures 9' of the outlet screen 9 into outlet manifold 14. We have found that in a constant depth, catalyst bed soot deposits will build on the catalyst material to such a point that considerable back pressure will develop because of the additional deposits on the material itself. By providing a means for establishing the group of spaced apart flow zones A and B it has been found that the soot will build up only in the zones having the high mass velocity.

Reference is now made to FIGS. 4a, 4b, 4c, and 4d where soot buildup and catalyst movement is schematically illustrated. In FIG. 4a the initial step of the buildup is illustrated. Soot buildup is schematically represented by /'s and x's drawn through each catalyst particle affected. It is seen in FIG. 4a that in the lower parts of zones. A soot has been deposited upon some of the catalyst particles. Buildup occurs in zones A because zones A have a high mass flow velocity than zones B and consequently each catalyst particle sees more soot than each particle of zones B. In FIG. 4b the soot has built up to a greater extent. In FIG. 4c the buildup has become extreme enough to cause a pressure buildup within zone A and thus the catalyst material within the zones A are schematically shown to have lifted under the influence of this pressure. It is to be noted that little or no soot buildup has taken place in the deeper zones B of the bed because the mass flow rate is considerably less than in the adjacent zones A and thus the catalyst particles are exposed to less soot and are thus given more time to oxidize the soot within the exhaust gas stream. As the particles lift in FIG. 4c, fresh particles from zones B flow to the lower parts of zones A. Consequently, since zones B are being depleneished of catalyst particles, the soot-coated partcles of zones A will move into the deeper zones B. The result is schematically illustrated in FIG. 4d where it is seen that there is a mixture of soot-coated particles in both zones A and B. After further operation of the converter, the soot on the soot-coated catalyst particles in zones B will be oxidized therefrom because of the relatively low mass velocity through zones B. In zones A the soot will continue to build up upon the catalyst material until movement of the particles occurs, and thereafter, the whole cycle is repeated. It is seen that the particular configuration of the present converter will establish a catalyst retaining section that is "self cleaning" as far as soot buildup is concerned.

In FIGS. 5 and 6 there is shown an alternate means for establishing the groups of adjacent spaced apart flow zones of varying flow resistance. An inlet screen section 30 which may be used in the converter of this invention is shown to be curved or molded to have longitudinal ridges 31 and valleys 32 as opposed to the concentric circular ridges and valleys of FIGS. 1 and 2 to establish a catalyst bed depth of varying predetermined depth. In FIGS. 7 and 8 another modified version of an inlet screen section for a catalytic converter is shown. There an inlet screen section 40 is shown with plates 41 connected to the top of the plate 40. Such an arrangement again will establish a catalyst retaining section of varying depth which in turn will establish groups of spaced apart flow zones of varying flow resistance. It is evident that other means may be utilized for establishing groups of adjacent flow zones. For example, instead of varying the depth of the bed, baffles or other suitable resistance means may be utilized to vary the flow resistance through the catalyst retaining section.

It is readily seen that the principles of this present invention may be utilized for converting soot-laden exhaust gases into harmless components. It may well be understood that various minor modifications in the design and/or location of the various components of this converter may be made without diverting from the scope of this present invention.

We claim as our invention:

1. A self-cleaning catalytic converter for conversion of soot-laden exhaust gases which comprises in combination:
   (a) an outer housing;
   (b) a catalyst retaining section having a lower inlet screen section and an upper outlet screen section spaced from the inlet screen section forming a catalyst retaining section, said catalyst retaining section being spaced within said outer housing to thereby establish an exhaust gas inlet manifold adjacent to said inlet screen section and an exhaust gas outlet manifold adjacent to said outlet screen section;
   (c) inlet means communicating with said inlet manifold for introducing untreated exhaust gases therein;
   (d) outlet means communicating with said outlet manifold for discharging treated exhaust gases therefrom;
   (e) catalyst material within said catalyst retaining section;
   (f) the lower of said screen sections having flow reristance means in association therewith for establishing a group of spaced apart first flow zones through said catalyst material and a group of spaced apart second flow zones having a different and normally higher flow resistance than the group of first flow zones positioned adjacent to the group of first flow zones, said flow resistance means in said lower of said screen sections including alternate ridges and valleys of approximately equal area comprising said first and second flow zones respectively, whereby the mass flow velocity of said exhaust gases will normally be greater through said group of first flow zones which have a lesser thickness of catalyst material than through the adjacent group of second flow zones wherein the thickness of the catalyst material is greater; and
   (g) an open zone provided adjacent the upper of said screen sections for permitting movement of catalyst material therein, whereby as the pressure drop increases in said group of first flow zones resulting from soot deposition in that group of flow zones, catalyst material will move from said first flow zone to the adjacent second flow zone, and will be replaced by catalyst material from the second flow zone thus permitting more efficient conversion of the soot within said exhaust gases and preventing significant reactor pressure drop increase.

2. The converter of claim 1 further characterized in that the inlet screen section is curved in a predetermined manner to provide said alternate ridges and valleys to vary the depth of the catalyst material within said first and second flow zones.

3. The converter of claim 1 further characterized in that the inlet screen section has intermediate plates positioned on one surface thereof to provide said alternate ridges and valleys.

4. The converter of claim 1 wherein the catalyst material has a spherical shape.

References Cited

UNITED STATES PATENTS

| | | | |
|---|---|---|---|
| 2,909,415 | 10/1959 | Houdry | 23—288 F |
| 3,024,593 | 3/1962 | Houdry | 23—288 F UX |
| 2,747,976 | 5/1956 | Houdry | 23—288 F |
| 2,772,147 | 11/1956 | Bowen et al. | 23—288 F |
| 3,479,145 | 11/1969 | Lentz | 23—288 F |

FOREIGN PATENTS

| | | | |
|---|---|---|---|
| 1,014,498 | 12/1965 | Great Britain | 23—288 F |

JOSEPH SCOVRONEK, Primary Examiner

U.S. Cl. X.R.

23—228 B, 288 E